(12) United States Patent
Seo et al.

(10) Patent No.: US 7,391,698 B2
(45) Date of Patent: *Jun. 24, 2008

(54) ADAPTIVE WRITING METHOD FOR HIGH-DENSITY OPTICAL RECORDING APPARATUS AND CIRCUIT THEREOF

(75) Inventors: Jin-gyo Seo, Seoul (KR); Seong-sin Joo, Suwon (KR); Du-seop Yoon, Suwon (KR); Myung-do Roh, Suwon (KR); Yong-jin Ahn, Seoul (KR); Seoung-soo Kim, Seoul (KR); Kyung-geun Lee, Sungnam (KR); Myeong-ho Cho, Seoul (KR); Chang-jin Yang, Suwon (KR); Jong-kyu Kim, Suwon (KR); Sung-ro Ko, Gunpo (KR); Tatsuhiro Ohtsuka, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

This patent is subject to a terminal disclaimer.

(21) Appl. No.: 11/432,473

(22) Filed: May 12, 2006

(65) Prior Publication Data

US 2006/0203677 A1  Sep. 14, 2006

Related U.S. Application Data

(60) Continuation of application No. 10/774,404, filed on Feb. 10, 2004, now Pat. No. 7,209,423, which is a continuation of application No. 09/609,822, filed on Jul. 3, 2000, now Pat. No. 7,158,461, which is a division of application No. 09/359,128, filed on Jul. 23, 1999, now Pat. No. 6,631,110.

(30) Foreign Application Priority Data

| Dec. 30, 1997 | (KR) | ................................. 97-77746 |
| Feb. 11, 1998 | (KR) | .................................. 98-4071 |
| Jul. 23, 1998 | (KR) | ................................ 98-297362 |

(51) Int. Cl.
*G11B 7/0045* (2006.01)
(52) U.S. Cl. .................................... 369/59.12
(58) Field of Classification Search ....................... None
See application file for complete search history.

(56) References Cited

U.S. PATENT DOCUMENTS 4,423,502 A  12/1983  Dil (Continued)

FOREIGN PATENT DOCUMENTS

EP  0388897  9/1990

(Continued)

OTHER PUBLICATIONS

Office Action issued in Chinese Patent Application No. 99111676.3 on Jun. 20, 2003.

(Continued)

*Primary Examiner*—Andrea Wellington
*Assistant Examiner*—Michael V Battaglia
(74) *Attorney, Agent, or Firm*—Stein, Mcewen & Bui, LLP

(57) ABSTRACT

An adaptive writing method of a high-density optical recording apparatus and a circuit thereof. The circuit includes a discriminator for discriminating a magnitude of a present mark of input NRZI data and magnitudes of leading and/or trailing spaces of the input NRZI data, a generator for controlling the waveform of a write pulse in accordance with the magnitude of the present mark of the input NRZI data and the magnitudes of the leading and/or trailing spaces of the input NRZI data to generate an adaptive write pulse, and a driver for driving a light source by converting the adaptive write pulse into a current signal in accordance with driving power levels for respective channels of the adaptive write pulse. The widths of the first and/or last pulses of the write pulse waveform are varied in accordance with the magnitude of the present mark of input NRZI data and the magnitude of the leading and/or trailing spaces, thereby minimizing jitter to enhance system reliability and performance.

18 Claims, 7 Drawing Sheets

U.S. PATENT DOCUMENTS

| | | | |
|---|---|---|---|
| 5,327,411 | A | 7/1994 | Iwasa et al. |
| 5,418,770 | A | 5/1995 | Ide et al. |
| 5,490,126 | A | 2/1996 | Furumiya et al. |
| 5,499,227 | A | 3/1996 | Higasa |
| 5,568,461 | A | 10/1996 | Nishiuchi et al. |
| 5,569,517 | A | 10/1996 | Tominaga et al. |
| 5,633,844 | A | 5/1997 | Maeda et al. |
| 5,636,194 | A | 6/1997 | Furumiya et al. |
| 5,642,343 | A | 6/1997 | Toda et al. |
| 5,646,928 | A * | 7/1997 | Wu et al. ............... 369/112.24 |
| 5,696,752 | A | 12/1997 | Hajjar et al. |
| 5,734,637 | A | 3/1998 | Ootaki et al. |
| 5,745,467 | A | 4/1998 | Sakaue et al. |
| 5,757,735 | A | 5/1998 | Fitzpatrick et al. |
| 5,850,378 | A | 12/1998 | Ninamino et al. |
| 6,018,508 | A | 1/2000 | Hasegawa |
| 6,044,055 | A | 3/2000 | Hara |
| 6,115,339 | A | 9/2000 | Winarski |
| 6,151,281 | A | 11/2000 | Van Der Enden et al. |
| 6,345,026 | B1 | 2/2002 | Furukawa et al. |
| 6,631,110 | B1 | 10/2003 | Seo et al. |
| 7,209,423 | B2 * | 4/2007 | Seo et al. ................. 369/59.12 |

FOREIGN PATENT DOCUMENTS

| | | |
|---|---|---|
| EP | 0851413 | 12/1997 |
| EP | 0851413 A2 | 7/1998 |
| JP | 3-22223 | 1/1991 |
| JP | 5-135363 | 6/1993 |
| JP | 6-12674 | 1/1994 |
| JP | 6-295440 | 10/1994 |
| JP | 6-325364 | 11/1994 |
| JP | 7-37250 | 2/1995 |
| JP | 7-121878 | 5/1995 |
| JP | 7-129959 | 5/1995 |
| JP | 7-225947 | 8/1995 |
| JP | 8-7282 | 1/1996 |
| JP | 8-180413 | 7/1996 |
| JP | 8-287465 | 11/1996 |
| JP | 9-81937 | 3/1997 |
| JP | 10-241164 | 9/1998 |
| KR | 93-524 | 1/1993 |

OTHER PUBLICATIONS

Office Action issued in Japaneses Patent Application No. 2002-2741 on Apr. 20, 2004.

Office Action issued in Japanese Patent Application No. 2002-2742 on Apr. 20, 2004.

Office Action issued in Japanese Patent Application No. 2002-2749 on Apr. 20, 2004.

Office Action issued in Japanese Patent Application No. 2000-319957.

U.S. Appl. No. 09/609,822, filed Jul. 3, 2000, Jin-gyo Seo et al., Samsung Electronics Co., Ltd.

U.S. Appl. No. 10/774,404, filed Feb. 10, 2004, Jin-gyo Seo et al., Samsung Electronics Co., Ltd.

U.S. Appl. No. 11/432,472, filed May 12, 2006, Jin-gyo Seo et al., Samsung Electronics Co., Ltd.

U.S. Appl. No. 11/685,538, filed Mar. 13, 2007, Jin-gyo Seo et al., Samsung Electronics Co., Ltd.

* cited by examiner

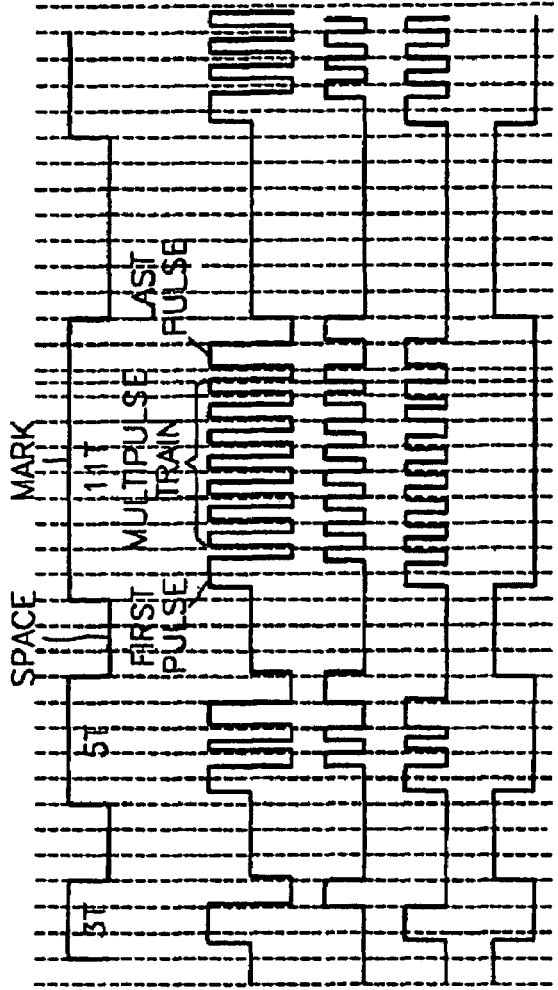
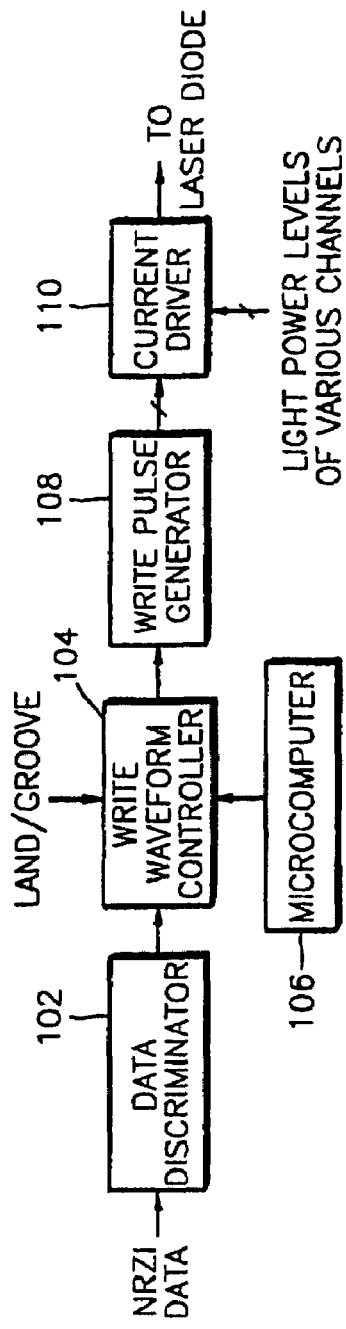

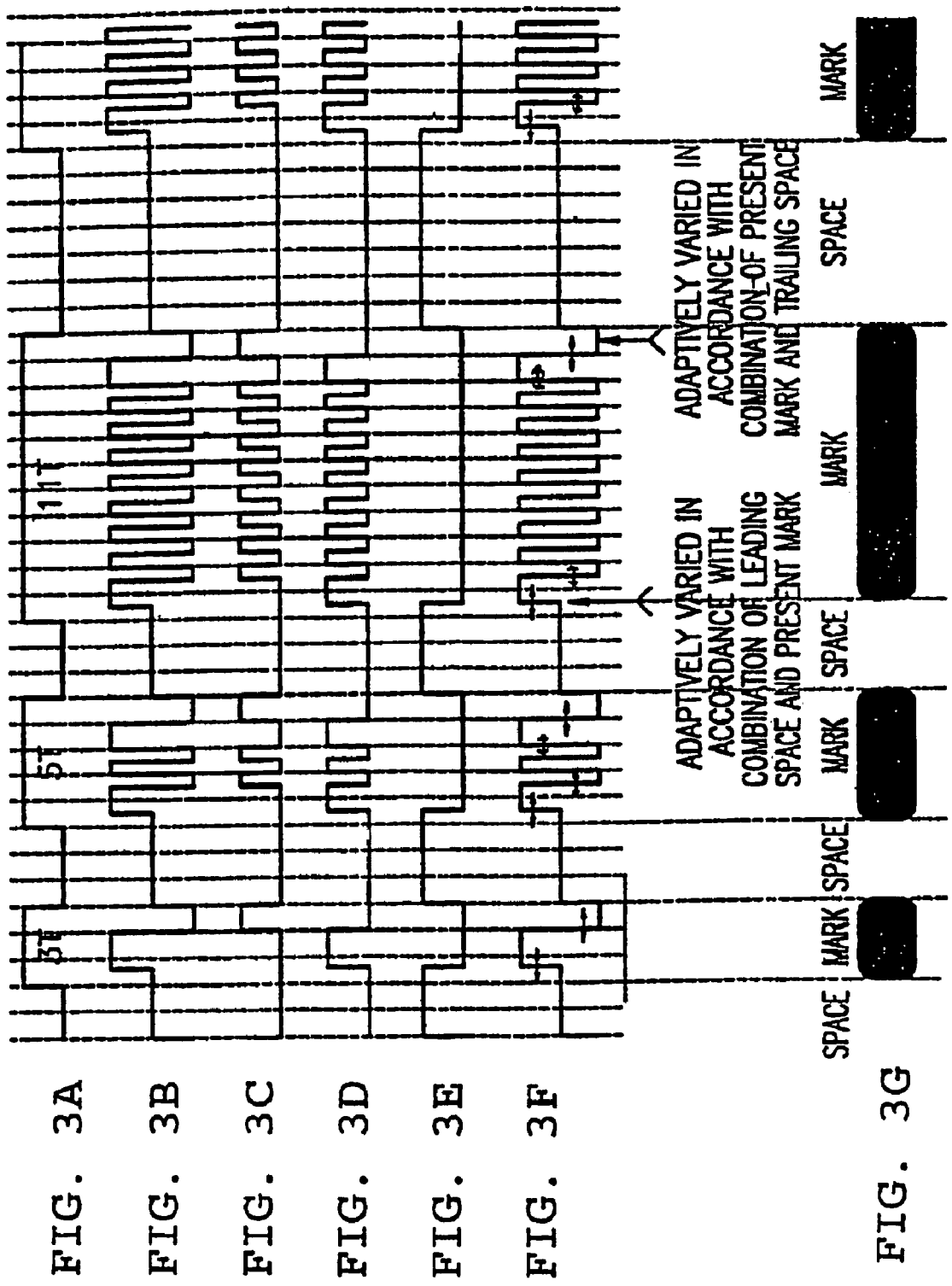

FIG. 5

| LEADING SPACE | PRESENT MARK | TRAILING SPACE |
|---|---|---|
| SHORT PULSE | SHORT PULSE | SHORT PULSE |
| SHORT PULSE | SHORT PULSE | MIDDLE PULSE |
| SHORT PULSE | SHORT PULSE | LONG PULSE |
| SHORT PULSE | MIDDLE PULSE | SHORT PULSE |
| SHORT PULSE | MIDDLE PULSE | MIDDLE PULSE |
| SHORT PULSE | MIDDLE PULSE | LONG PULSE |
| SHORT PULSE | LONG PULSE | SHORT PULSE |
| SHORT PULSE | LONG PULSE | MIDDLE PULSE |
| SHORT PULSE | LONG PULSE | LONG PULSE |
| MIDDLE PULSE | SHORT PULSE | SHORT PULSE |
| MIDDLE PULSE | SHORT PULSE | MIDDLE PULSE |
| MIDDLE PULSE | SHORT PULSE | LONG PULSE |
| MIDDLE PULSE | MIDDLE PULSE | SHORT PULSE |
| MIDDLE PULSE | MIDDLE PULSE | MIDDLE PULSE |
| MIDDLE PULSE | MIDDLE PULSE | LONG PULSE |
| MIDDLE PULSE | LONG PULSE | SHORT PULSE |
| MIDDLE PULSE | LONG PULSE | MIDDLE PULSE |
| MIDDLE PULSE | LONG PULSE | LONG PULSE |
| LONG PULSE | SHORT PULSE | SHORT PULSE |
| LONG PULSE | SHORT PULSE | MIDDLE PULSE |
| LONG PULSE | SHORT PULSE | LONG PULSE |
| LONG PULSE | MIDDLE PULSE | SHORT PULSE |
| LONG PULSE | MIDDLE PULSE | MIDDLE PULSE |
| LONG PULSE | MIDDLE PULSE | LONG PULSE |
| LONG PULSE | LONG PULSE | SHORT PULSE |
| LONG PULSE | LONG PULSE | MIDDLE PULSE |
| LONG PULSE | LONG PULSE | LONG PULSE |

FIG. 6

| LEADING SPACE | PRESENT MARK | RISING EDGE SHIFT OF FIRST PULSE(nS) |
|---|---|---|
| SHORT PULSE | SHORT PULSE | +1 |
| SHORT PULSE | MIDDLE PULSE | −1 |
| SHORT PULSE | LONG PULSE | −3 |
| MIDDLE PULSE | SHORT PULSE | +2 |
| MIDDLE PULSE | MIDDLE PULSE | 0 |
| MIDDLE PULSE | LONG PULSE | −2 |
| LONG PULSE | SHORT PULSE | −3 |
| LONG PULSE | MIDDLE PULSE | −1 |
| LONG PULSE | LONG PULSE | 0 |

FIG. 7

| PRESENT MARK | TRAILING SPACE | FALLING EDGE SHIFT OF LAST PULSE(nS) |
|---|---|---|
| SHORT PULSE | SHORT PULSE | +1 |
| MIDDLE PULSE | SHORT PULSE | +2 |
| LONG PULSE | SHORT PULSE | +4 |
| SHORT PULSE | MIDDLE PULSE | −1 |
| MIDDLE PULSE | MIDDLE PULSE | 0 |
| LONG PULSE | MIDDLE PULSE | +1 |
| SHORT PULSE | LONG PULSE | −3 |
| MIDDLE PULSE | LONG PULSE | −1 |
| LONG PULSE | LONG PULSE | 0 |

A ADAPTIVE WRITING METHOD FOR HIGH-DENSITY OPTICAL RECORDING APPARATUS AND CIRCUIT THEREOF

CROSS-REFERENCE TO RELATED APPLICATIONS

This application is a continuation of application Ser. No. 10/774,404, filed Feb. 10, 2004, now U.S. Pat. No. 7,209,423, which is a continuation of application Ser. No. 09/609,822, filed Jul. 3, 2000, now U.S. Pat. No. 7,158,461, which is a divisional of application Ser. No. 09/359,128, filed Jul. 23, 1999, now U.S. Pat. No. 6,631,110 and claims the benefit of Korean Patent Application No. 98-29732, filed Jul. 23, 1998, in the Korean Industrial Patent Office, the disclosures of which are incorporated herein by reference.

BACKGROUND OF THE INVENTION

1. Field of the Invention

The present invention relates to an adaptive writing method for a high-density optical recording apparatus and a circuit thereof, and more particularly, to an adaptive writing method for optimizing light power of a light source, e.g., a laser diode, to be suitable to characteristics of a recording apparatus, and a circuit thereof.

2. Description of the Related Art

With the multi-media era requiring high-capacity recording media, optical recording systems employing high-capacity recording media, such as a magnetic optical disc drive (MODD) or a digital versatile disc random access memory (DVD-RAM) drive, have been widely used.

As the recoding density increases, such optical recording systems require optimal and high-precision states. In general, with an increase in recording density, temporal fluctuation (to be referred to as jitter, hereinafter) in a data domain increases. Thus, in order to attain high-density recording, it is very important to minimize the jitter.

Conventionally, a write pulse is formed as specified in the DVD-RAM format book shown in FIG. 1B, with respect to input NRZI (Non-Return to Zero Inversion) data having marks of 3T, 5T and 11T (T being the channel clock duration), as shown in FIG. 1A. Here, the NRZI data is divided into mark and space. The spaces are in an erase power level for overwriting. The waveform of a write pulse for marks equal to or longer than 3T mark, that is, 3T, 4T, . . . 11T and 14T is comprised of a first pulse, a last pulse and a multi-pulse train. Here, only the number of pulses in the multi-pulse train is varied depending on the magnitude of a mark.

In other words, the waveform of the write pulse is comprised of a combination of read power (FIG. 1C), peak power or write power (FIG. 1D) and bias power or erase power (FIG. 1E). Here, the respective power signals shown in FIGS. 1C, 1D and 1E are all low-active signals.

The waveform of the write pulse is the same as that in accordance with the first generation 2.6 GB DVD-RAM standard. In other words, in accordance with the 2.6 GB DVD-RAM standard, the waveform of the write pulse is comprised of a first pulse, a multi-pulse train and a last pulse. Although the rising edge of the first pulse or the falling edge of the last pulse can be read from a lead-in area to be used, adaptive writing is not possible since the write pulse is fixed to be constant.

Therefore, when a write operation is performed by forming such a write pulse as shown in FIG. 1B, severe thermal interference may occur back and forth with respect to a mark in accordance with input NRZI data. In other words, when a mark is long and a space is short or vice versa, jitter is most severe. This is a major cause of lowered system performance. Also, this does not make it possible for the system to be applied to high-density DVD-RAMs, e.g., second generation 4.7 GB DVD-RAMs.

SUMMARY OF THE INVENTION

To solve the above problems, it is an objective of the present invention to provide an adaptive writing method of a write pulse generated in accordance with the magnitude of the present mark of input data and the magnitudes of the leading and/or trailing spaces thereof.

It is another objective of the present invention to provide an adaptive writing circuit for a high-density optical recording apparatus for optimizing light power of a laser diode by generating an adaptive write pulse in accordance with the magnitude of the present mark of input data and the magnitudes of the leading and trailing spaces thereof.

Accordingly, to achieve the first objective, there is provided a method for writing input data on an optical recording medium by a write pulse whose waveform is comprised of a first pulse, a last pulse and a multi-pulse train, the adaptive writing method including the steps of controlling the waveform of the write pulse in accordance with the magnitude of the present mark of the input data and the magnitudes of the leading and/or trailing spaces to generate an adaptive write pulse, and writing the input data by the adaptive write pulse on the optical recording medium.

To achieve the second objective, there is provided an apparatus for writing input data on an optical recording medium by a write pulse whose waveform is comprised of a first pulse, a last pulse and a multi-pulse train, the adaptive writing circuit including a discriminator for discriminating the magnitude of the present mark of the input data and the magnitudes of the leading and/or trailing spaces, a generator for controlling the waveform of the write pulse in accordance with the magnitude of the present mark of the input data and the magnitudes of the leading and/or trailing spaces to generate an adaptive write pulse, and a driver for driving the light source by converting the adaptive write pulse into a current signal in accordance with driving power levels for the respective channels.

BRIEF DESCRIPTION OF THE DRAWINGS

The above objectives and advantages of the present invention will become more apparent by describing in detail a preferred embodiment thereof with reference to the attached drawings in which:

FIGS. 1A through 1E are waveform diagrams of conventional write pulses;

FIG. 2 is a block diagram of an adaptive writing circuit for a high-density optical recording apparatus according to an embodiment of the present invention;

FIGS. 3A through 3G are waveform diagrams of an adaptive write pulse recorded by the adaptive writing circuit shown in FIG. 2;

FIG. 5 is a table illustrating the combination of pulses generated by the grouping shown in FIG. 4;

FIG. 6 is a table illustrating rising edge shift values of a first pulse according to the present invention;

FIG. 7 is a table illustrating falling edge shift values of a last pulse according to the present invention;

DESCRIPTION OF THE PREFERRED EMBODIMENTS

Figure 4:
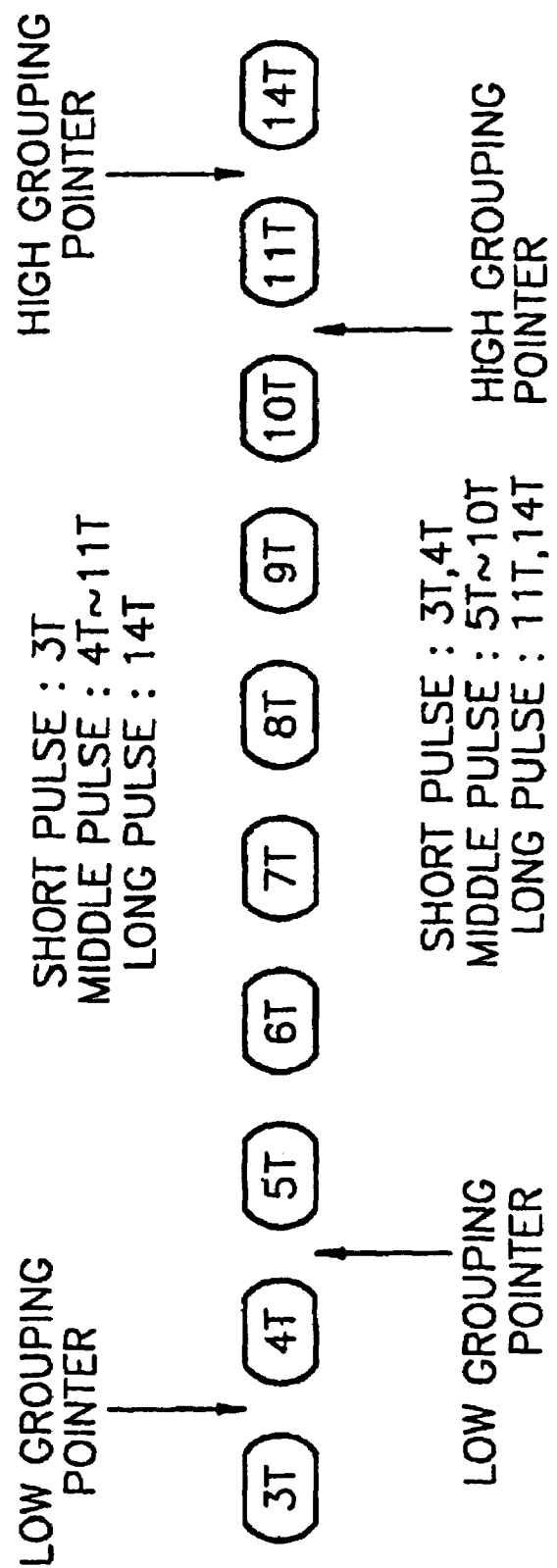
FIG. 4 illustrates grouping of input data.

Hereinafter, a preferred embodiment of an adaptive writing method for a high-density optical recording apparatus and a circuit thereof will be described with reference to the accompanying drawings.

An adaptive writing circuit according to the present invention, as shown in FIG. 2, includes a data discriminator 102, a write waveform controller 104, a microcomputer 106, a write pulse generator 108 and a current driver 110. In other words, the data discriminator 102 discriminates input NRZI data. The write waveform controller 104 corrects the waveform of a write pulse in accordance with the discrimination result of the data discriminator 102 and land/groove signal. The microcomputer 106 initializes the write waveform controller 104 or controls the data stored in the write waveform controller 104 to be updated in accordance with write conditions. The write pulse generator 108 generates an adaptive write pulse in accordance with the output of the write waveform controller 104. The current driver 110 converts the adaptive write pulse generated from the write pulse generator 108 into a current signal in accordance with the light power levels of the respective channels to drive a light source.

Next, the operation of the apparatus shown in FIG. 2 will be described with reference to FIGS. 3 through 7.

In FIG. 2, the data discriminator 102 discriminates the magnitude of a mark corresponding to the present write pulse (to be referred to as a present mark), the magnitude of the front-part space corresponding to the first pulse of the present mark (to be referred to as a leading space, hereinafter) and the magnitude of the rear-part space corresponding to the last pulse of the present mark (to be referred to as a trailing space) from input NRZI data, and applies the magnitudes of the leading and trailing spaces and the magnitude of the present mark to the write waveform controller 104.

Here, the magnitudes of the leading and trailing spaces and the magnitude of the present mark may range from 3T to 14T. There can be more than 1,000 possible combinations. Thus, circuits or memories for obtaining the amounts of shift in rising edges of the first pulses and falling edges of the last pulses are necessary with respect to all cases, which complicates the system and hardware. Therefore, in the present invention, the magnitudes of the present mark and the leading and trailing spaces of input NRZI data are grouped into a short pulse group, a middle pulse group and a long pulse group and the grouped magnitudes of the present mark and the leading and trailing spaces are used.

The write waveform controller 104 shifts the rising edge of the first pulse back and forth in accordance with the magnitudes of the leading space and the present mark, supplied from the data discriminator 102, or shifts the falling edge of the last pulse back and forth in accordance with the magnitudes of the present mark and the trailing space, to thus form a write waveform having an optimal light power. Here, the multi-pulse train of a mark takes the same shape as shown in FIG. 3B, that is, 0.5T.

Also, the write waveform controller 104 can correct the rising edge of the first pulse of the present mark and the falling edge of the last pulse of the present mark into different values in accordance with externally applied land/groove signals (LAND/GROOVE) indicating whether the input NRZI data is in a land track or a groove track. This is for forming a write waveform in consideration of different optimal light powers depending on the land and groove. A difference of 1-2 mW in the optimal light powers between the land and the groove, and may be specifically set or managed by the specifications.

Therefore, the write waveform controller 104 may be constituted by a memory in which data corresponding to a shift value of the rising edge of the first pulse and a shift value of the falling edge of the last pulse in accordance with the magnitude of the present mark of input NRZI data and the magnitudes of the leading and trailing spaces thereof, is stored, or a logic circuit. In the case that the write waveform controller 104 is constituted by a memory, the widths of the first pulse and the last pulse are determined as channel clocks (T) plus and minus a data value (shift value) stored in the memory. Also, in this memory, shift values of the first and last pulses of the mark for each of a land and a groove may be stored. A table in which the shift value of the rising edge of the first pulse is stored and a table in which the shift value of the falling edge of the last pulse is stored may be incorporated. Alternatively, as shown in FIGS. 6 and 7, two separate tables may be prepared.

A microcomputer 106 initializes the write waveform controller 104 or controls the shift values of the first and/or last pulse(s) to be updated in accordance with recording conditions. In particular, in accordance with zones, the light power can vary or the shift values of the first and last pulses can be reset.

The pulse width data for controlling the waveform of the write pulse is provided to the write pulse generator 108. The write pulse generator 108 generates an adaptive write pulse, as shown in FIG. 3F, in accordance with the pulse width data for controlling the waveform of the write pulse supplied from the write waveform controller 104 and supplies control signals shown in FIGS. 3C, 3D and 3E, for controlling the current flow for the respective channels (i.e., read, peak and bias channels) for the adaptive write pulse, to the current driver 110.

The current driver 110 converts the driving level of the light power of the respective channels (i.e., read, peak and bias channels) into current for a control time corresponding to the control signal for controlling the current flow of the respective channels to allow the current to flow through the laser diode so that an appropriate amount of heat is applied to the recording medium by continuous ON-OFF operations of the laser diode or a change in the amounts of light. Here, a record domain as shown in FIG. 3G is formed on the recording medium.

FIG. 3A shows input NRZI data, which is divided into mark and space. FIG. 3B shows a basic write waveform, in which the rising edge of the first pulse of the write pulse lags behind by 0.5T, compared to the rising edge of the present mark. FIG. 3C shows the waveform of a read power of the adaptive write pulse, FIG. 3D shows the waveform of a peak power of the adaptive write pulse, and FIG. 3E shows the waveform of a bias power of the adaptive write pulse. FIG. 3F shows the waveform of the adaptive write pulse proposed in the present invention. The rising edge of the first pulse of the write waveform of the adaptive write pulse may be shifted back and forth in accordance with a combination of the magnitude of the leading space and the magnitude of the present mark. An arbitrary power (Here, a read power or a write power) is applied during the period corresponding to the shift. Likewise, the falling edge of the last pulse of the adaptive write pulse may be shifted back and forth in accordance with a combination of the magnitude of the present mark and the magnitude of the trailing space. Also, an arbitrary power (here, a read power or a write power) is applied during the period corresponding to the shift.

Alternatively, the falling edge of the last pulse may be shifted back and forth in accordance with the magnitude of the present mark, regardless of the magnitude of the trailing space of the present mark. Also, rather than shifting the rising edge of the first pulse and the falling edge of the last pulse, the edge of any one pulse may be shifted. Also, in view of the direction of shift, shifting may be performed back and forth, only forward or only backward.

FIG. 4 illustrates grouping of input NRZI data, showing two examples of grouping. In the first example, if a low grouping pointer is 3 and a high grouping pointer is 12, then the mark of a short pulse group is 3T, the marks of a middle pulse group are from 4T to 11T and the mark of a long pulse group is 14T. In the second example, if a low grouping pointer is 4 and a high grouping pointer is 11, then the marks of a short pulse group are 3T and 4T, the marks of a middle pulse group are from 5T to 10T and the marks of a long pulse group are 11T and 14T. As described above, since both the low grouping pointer and the high grouping pointer are used, utility efficiency is enhanced. Also, grouping can be performed differently for the respective zones.

FIG. 5 illustrates the number of cases depending on combinations of leading and trailing spaces and present marks, in the case of classifying input NRZI data into three groups, as shown in FIG. 4, using grouping pointers. FIG. 6 illustrates a table showing shift values of rising edges of the first pulse depending on the magnitude of the leading space and the magnitude of the present mark. FIG. 7 illustrates a table showing shift values of falling edges of the last pulse depending on the magnitude of the present mark and the magnitude of the trailing space.

Figure 8:
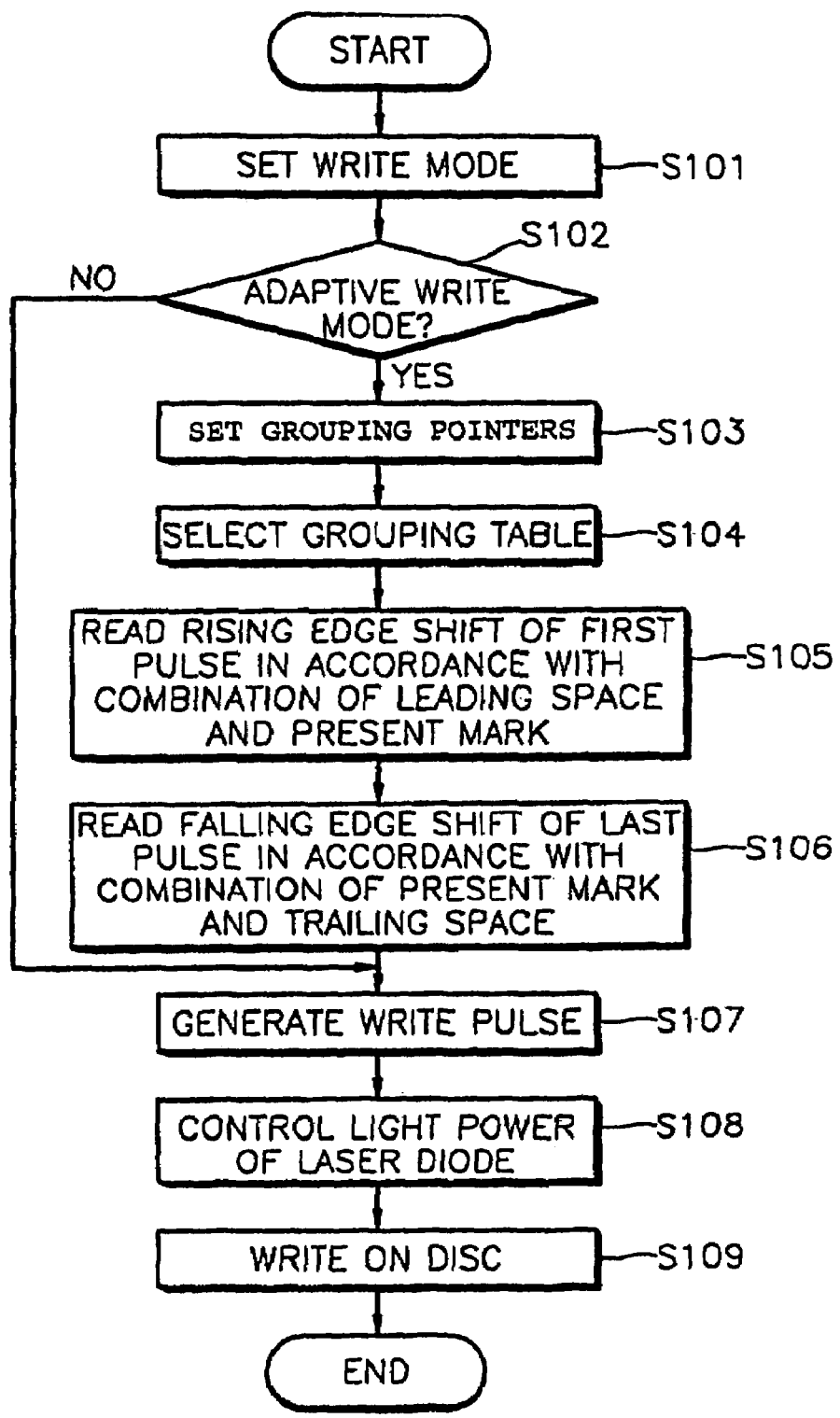
FIG. 8 is a flowchart of an adaptive writing method according to an embodiment of the present invention.

FIG. 8 is a flow chart illustrating an embodiment of an adaptive writing method of the present invention. First, a write mode is set (step S101). If the write mode is set, it is determined whether it is an adaptive writing mode or not (step S102). If it is determined in step S102 that the write mode is an adaptive write mode, a grouping pointer is set (step S103). Then, a grouping table depending on the set grouping pointer is selected (step S104). The selected grouping table may be a table reflecting land/groove as well as the grouping pointer. Also, the selected grouping table may be a table reflecting zones of the recording medium.

Shift values of the rising edge of the first pulse are read from the table shown in FIG. 6 in accordance with a combination of the present mark and the leading space (step S105), and shift values of the falling edge of the last pulse are read from the table shown in FIG. 7 in accordance with a combination of the present mark and the trailing space (step S106). The adaptive write pulse in which the first pulse and the last pulse are controlled in accordance with the read shift value is generated (step S107). Then, the light powers of the respective channels for the generated adaptive write pulse, i.e., read, peak and bias powers, are controlled to drive a laser diode (step S108) to then perform a write operation on a disc (step S109). If the write mode is not an adaptive write mode, a general write pulse is generated in step S107.

Figure 9:
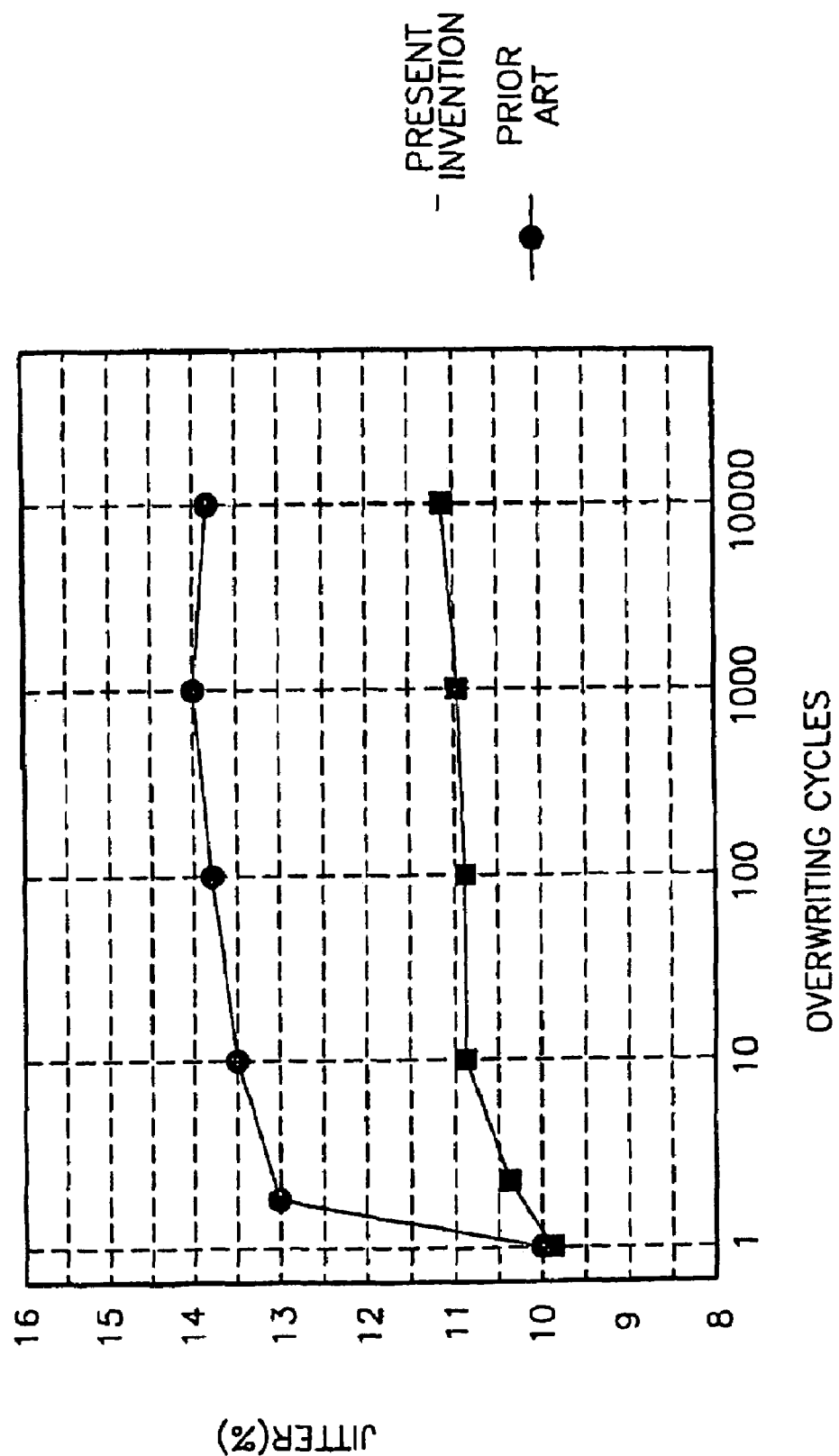
FIG. 9 is a graph for comparing jitter generated by the adaptive writing method of the present invention and the conventional writing method.

FIG. 9 is a graph for comparing jitter generated by the adaptive writing method according to the present invention and the conventional writing method. It is understood that, assuming that the peak light is 9.5 mW, the bottom power of a multi-pulse train is 1.2 mW, the cooling power is 1.2 mW and the bias power is 5.2 mW, there is less jitter generated when writing the adaptive write pulse according to the present invention than when generated writing the fixed write pulse according to the conventional writing method. The initialization conditions are a speed of 4.2 m/s, an erase power of 7.2 mW and 100 write operations.

In other words, according to the present invention, in adaptively varying the marks of a write pulse, the rising edge of the first pulse is adaptively shifted in accordance with the magnitude of the leading space and the magnitude of the present mark of input NRZI data to thus control the waveform of the write pulse, and/or the falling edge of the last pulse is adaptively shifted in accordance with the magnitude of the present mark and the magnitude of the trailing space of input NRZI data to thus control the waveform of the write pulse, thereby minimizing jitter. Also, the waveform of the write pulse may be optimized in accordance with land/groove signals. Also, in the present invention, grouping may be performed differently for the respective zones, using grouping pointers.

A new adaptive writing method according to the present invention can be adopted to most high-density optical recording apparatuses using an adaptive writing pulse.

As described above, the widths of the first and/or last pulses of a write pulse waveform are varied in accordance with the magnitude of the present mark of input NRZI data and the magnitude of the leading or trailing space, thereby minimizing jitter to enhance system reliability and performance. Also, the width of a write pulse is controlled by grouping the magnitude of the present mark and the magnitude of the leading or trailing spaces, thereby reducing the size of a hardware.

What is claimed is:

1. An apparatus for writing input data on an optical recording medium using a write pulse waveform including a first pulse, a last pulse and a multi-pulse train, the apparatus comprising:
   a controller controlling the write pulse waveform based on a grouping table to generate an adaptive write pulse waveform by varying a position of a rising edge of the first pulse of a mark to be written according to a length of the mark to be written and a leading space, the grouping table storing rising edge data of the first pulse of the write pulse waveform varying according to corresponding stored values of lengths of marks to be written; and
   an optical pickup optically writing the input data on the optical recording medium using the adaptive write pulse waveform,
   wherein the generated adaptive write pulse waveform is generated without regard for a trailing space of a present mark being written using the adaptive write pulse waveform, and a width of the first pulse is varied by varying the position of the rising edge.

2. The apparatus of claim 1, wherein the grouping table stores the rising edge data of the first pulses for the write pulse waveform according to corresponding stored values of lengths of marks to be written and the leading space grouped according to a first preset length of the mark and space and a second preset length of the mark and space.

3. The apparatus of claim 2, wherein the grouping table pulse groups comprise a short pulse group and another pulse group.

4. The apparatus of claim 1, wherein the controlling the write pulse waveform comprises determining from the input data a length of a present mark to be written, and selecting from the grouping table one of the rising edge data of the first pulse of the write pulse waveform which is associated with the length of the mark which corresponds to the determined length.

5. The apparatus of claim 4, wherein the controlling the write pulse waveform further comprises determining from the input data another length of a space adjacent to the present mark to be written, and the selecting from the grouping table comprises selecting one of the rising edge data of the first pulse of the write pulse waveform which is associated with both a length of the mark which corresponds to the determined length and a length of a space which corresponds to the another determined length.

6. The apparatus of claim 1, wherein the controlling the write pulse waveform further comprises determining from the input data a length of a space adjacent to a present mark to be written, and selecting from the grouping table one of the rising edge data of the first pulse of the write pulse waveform which is associated with a length of a space which corresponds to the determined length.

7. An apparatus for writing input data on an optical recording medium using a write pulse waveform including a first pulse, a last pulse and a multi-pulse train, the apparatus comprising:
  a controller controlling the write pulse waveform based on a grouping table having width data grouped in pulse groups which group the first and last pulses of the write pulse waveform by corresponding lengths of a present mark of input data and a leading space of the present mark to generate an adaptive write pulse waveform by varying a position of a rising edge of the first pulse of a mark to be written according to a length of at least a mark to be written and/or a leading space; and
  an optical pickup optically writing the input data on the optical recording medium using the adaptive write pulse waveform,
  wherein the grouping table stores rising edge data of the first pulse of the write pulse waveform grouped in corresponding pulse groups according to lengths of marks to be written and lengths of spaces adjacent to the marks to be written, and
  the width of the first pulse is varied by varying the position of the rising edge.

8. The apparatus of claim 7, wherein the controlling the write pulse waveform comprises determining from the input data a length of a present mark to be written, and selecting from the grouping table one of the rising edge data of the first pulse of the write pulse waveform which is associated with the stored length value of the mark to be written which corresponds to the determined length.

9. The apparatus of claim 8, wherein the controlling the write pulse waveform comprises determining from the input data another length of a leading space adjacent to the present mark, and the selecting from the grouping table comprises selecting one of the rising edge data of the first pulse of the write pulse waveform which is associated with both a stored length value of a mark which corresponds to the determined length and a stored length value of the space which corresponds to the another determined length.

10. The apparatus of claim 7, wherein the controlling the write pulse waveform comprises determining from the input data a length of a lead space of a present mark to be written, and selecting from the grouping table one of the rising edge data of the first pulse of the write pulse waveform which is associated with a stored length value of the leading space which corresponds to the determined length.

11. The apparatus of claim 7, wherein the generated adaptive write pulse waveform is generated according to the lengths of the present mark and the leading space regardless of a length of a trailing space of the present mark.

12. The apparatus of claim 7, wherein the pulse groups comprise a short pulse group and another pulse group, each member of the another pulse group having lengths greater than each member of the short pulse group.

13. An apparatus for writing input data on an optical recording medium using a write pulse waveform including a first pulse, a last pulse and a multi-pulse train, comprising:
  a controller controlling the write pulse waveform based on a grouping table to generate an adaptive write pulse waveform by varying a position of a rising edge of the first pulse of the mark to be written according to a length of at least a mark to be written and a leading space, the grouping table storing rising edge data of the first pulse of the write pulse waveform grouped in corresponding pulse groups according to lengths of marks to be written and lengths of spaces adjacent to the marks to be written; and
  an optical pickup optically writing the input data on the optical recording medium using the adaptive write pulse waveform,
  wherein the width of the first pulse is varied by varying the position of the rising edge.

14. The apparatus of claim 13, wherein the controlling the write pulse waveform comprises determining from the input data a length of a present mark to be written, and selecting from the grouping table one of the rising edge data of the first pulse of the write pulse waveform which is associated with the length of the mark which corresponds to the determined length.

15. The apparatus of claim 14, wherein the controlling the write pulse waveform comprises determining from the input data another length of a space adjacent to the present mark to be written, and the selecting from the grouping table comprises selecting one of the rising edge data of the first pulse of the write pulse waveform which is associated with both a length of a mark which corresponds to the determined length and a length of the space which corresponds to the another determined length.

16. The apparatus of claim 13, wherein the controlling the write pulse waveform comprises determining from the input data a length of a space adjacent to a present mark to be written, and selecting from the grouping table one of the rising edge data of the first pulse of the write pulse waveform which is associated with a length of a space which corresponds to the determined length.

17. The apparatus of claim 13, wherein:
  the present mark comprises another adjacent space other than the adjacent space such that the present mark is between the adjacent space and the another adjacent space; and
  the generated adaptive write pulse waveform is generated according to the lengths of the present mark and the adjacent space regardless of a length of the another adjacent space of the present mark.

18. The apparatus of claim 13, wherein the pulse groups comprise a short pulse group and another pulse group, each member of the another pulse group having lengths greater than each member of the short pulse group.

* * * * *

UNITED STATES PATENT AND TRADEMARK OFFICE
CERTIFICATE OF CORRECTION

| | | |
|---|---|---|
| PATENT NO. | : 7,391,698 B2 | Page 1 of 1 |
| APPLICATION NO. | : 11/432473 | |
| DATED | : June 24, 2008 | |
| INVENTOR(S) | : Jin-gyo Seo et al. | |

It is certified that error appears in the above-identified patent and that said Letters Patent is hereby corrected as shown below:

Title Page, Item (30) Foreign Priority Data, delete
"Dec. 30, 1997 (KR) 97-77746
Feb. 11, 1998 (KR) 98-4071"

Title Page, Item (30) Foreign Priority Date, change
"Jul. 23, 1998 (KR) 98-297362" to
--Jul. 23, 1998 (KR) 98-29732--.

Column 6, line 49, change "pulses" to --pulse--.

Signed and Sealed this

Thirteenth Day of March, 2012

David J. Kappos
*Director of the United States Patent and Trademark Office*